United States Patent [19]
Sakate et al.

[11] Patent Number: 5,033,231
[45] Date of Patent: Jul. 23, 1991

[54] NET FOR GRASSING

[75] Inventors: Michihei Sakate, Tsuyama City; Masashi Shibata, Kuwashimo; Katsumi Tamura, Kugyo; Tomofumi Matsumoto, Tsuyama, all of Japan

[73] Assignee: Nisshoku Corporation, Tsuyama, Japan

[21] Appl. No.: 420,358

[22] Filed: Oct. 12, 1989

[51] Int. Cl.⁵ .............................................. A01G 1/00
[52] U.S. Cl. ...................................................... 47/56
[58] Field of Search ................... 47/56; 139/383, 425; 162/348, DIG. 1

[56] References Cited

U.S. PATENT DOCUMENTS

| | | | |
|---|---|---|---|
| 2,923,093 | 2/1960 | Allen | 47/56 |
| 2,976,646 | 3/1961 | Hansen et al. | 47/56 |
| 3,704,544 | 12/1972 | Spanel et al. | 47/56 |
| 3,845,584 | 11/1974 | Mercer | 47/56 |
| 4,314,589 | 2/1982 | Buchanan et al. | 162/348 |

Primary Examiner—Richard E. Chilcot, Jr.
Assistant Examiner—Michele A. Van Patten
Attorney, Agent, or Firm—Joseph W. Price

[57] ABSTRACT

A net for grassing obtained by knitting and weaving wefts having an appointed width in a texture less than said width by means of a large number of warps and having mountain portions and valley portions randomly formed on a right side and a reverse side thereof.

Earth and sand and sprayed materials can be prevented from being washed away in the first stage of the protective construction for a face of slope.

20 Claims, 3 Drawing Sheets

Fig.4(A)
Fig.4(B)
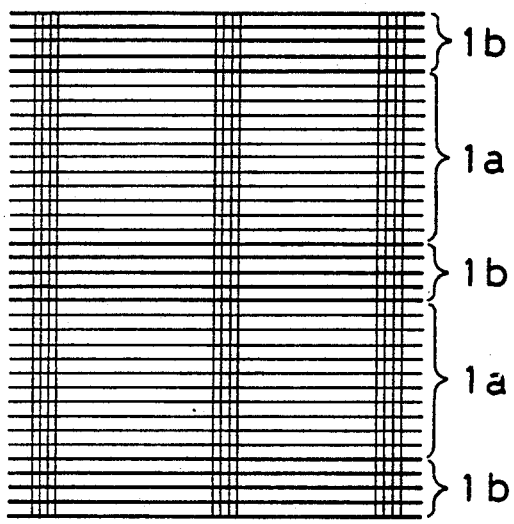
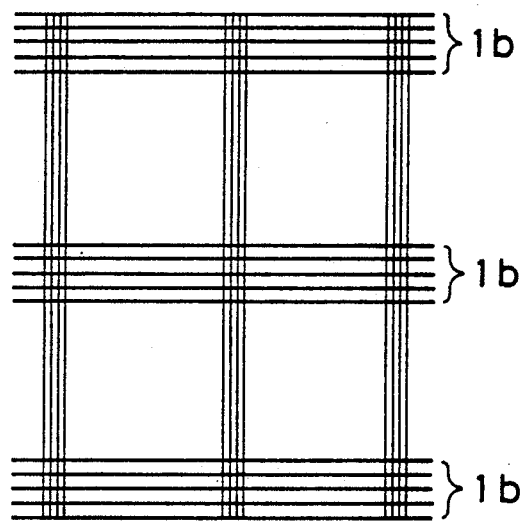
Fig.5
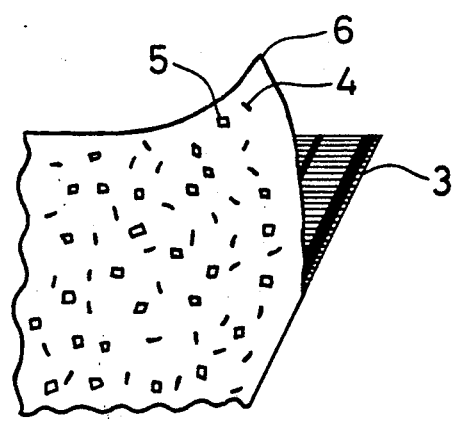

NET FOR GRASSING

BACKGROUND OF THE INVENTION

1. Field of the Invention

The present invention relates to a net to encourage the growth of grass capable of preventing earth and sand on a face of a slope and sprayed materials from being washed away in the first stage of the protective construction of the face of slope which has little influence upon the environment.

2. Description of the Prior Art

Various kinds of products have been used for the conventional protection of a face of a slope. Above all, a net for grassing has shown advantages in that for example (a) it can be unified in standard as products, (b) it can cover all of the face of a slope to prevent earth and sand as well as sprayed materials from being washed away, and (c) it can be constructed inexpensively and in a short time. As a result, it has been used in many protective constructions of a face of a slope.

However, the conventional net for grassing has shown the following disadvantages.

A net for grassing, which has been conventionally used, has been formed of various kinds of material, such as vegetable materials, chemical materials and metallic materials, but every net for grassing has been formed of single wires, ropes or the like having an almost circular section (that is having no irregular unevenness) to merely hold earth and sand or sprayed materials that is coiled around a surface thereof. It, therefore, could not be said that the conventional net for grassing could entirely prevent earth and sand on the face of slope or the sprayed materials from being washed away. Also in the case where the conventional net for grassing is installed on the face of slope, the net itself has no unevenness, so that rain water flowing down along the face of slope gets over the net to flow down along the face of slope. As a result, the rain water is not dispersed to be collected at one place thereby gully erosion has also been produced on the face of slope in many cases.

So, many investigators have tackled with the improvement of the above described problems to propose a method in which a large number of gaps are formed intermittently and in parallel in for example papers, textiles or chemical and metallic sheets and these sheets are spread in a net-like shape at a construction site to prevent soils from being washed away.

However, in the cases of papers and textiles, the formation of the gaps led to the remarkable reduction of the strength thereby sufficient effect could not be achieved. In addition, in the cases of chemical or metallic sheets, a problem has occurred in that they are sufficient in strength but they can not be expected to corrode like a vegetable net to be turned into a part of soil, thereby surface soils are washed away, in the first stage of construction in many cases.

So, in view of the balance of the cost and the effect, a vegetable net, which can be corroded within about one to two years to be turned into soil organic substances, has been used in many cases as a net for grassing and is used particularly in mountain management and the like. A so-called straw turf, which is obtained by adhering seeds, fertilizers or thin cotton to mat-like substances or rushmat-like substances obtained by knitting or weaving straws as wefts by means of warps, has also been typically used.

However, also the above described straw turf is still formed of a material having an almost circular section thereby it can not be said that earth and sand sprayed materials can be sufficiently prevented from being washed away. Thus, the development of a net for grassing which is superior in intimacy to soils in the first stage and effect for preventing earth and sand and sprayed materials from being washed away in the first stage of construction in place of the straw turf has been expected.

In addition, a net for grassing formed of twisted threads, which is represented by one disclosed in Japanese Utility Model Application No. Sho 58-32069, has been proposed as a substitute for the conventional straw turf. However, also the net for grassing formed of twisted threads is formed of a material having an almost circular section like in the straw turf. It, therefore, could not be said the earth and sand and sprayed materials could be sufficiently prevented from being washed away.

SUMMARY OF THE INVENTION

The present inventors have discovered, from their various kinds of investigation on the above described problems, that a net to encourage the growth of grass capable of preventing earth and sands and sprayed materials from being washed away in the first stage of construction and dispersing the surface water can be provided by knitting and weaving wefts of 3 mm to 3 cm wide formed of tape-like papers or nonwoven fabrics or chemical flat yarns by means of a large number of warps in a texture less than said width to randomly form mountain portions and valley portions and give a volume, thereby achieving the present invention.

That is to say, the present invention relates to a net for grassing, characterized by comprising wefts of 3 mm to 3 cm wide formed of tape-like papers and nonwoven fabrics or chemical flat yarns and a large number of warps knitting and weaving said wefts in a texture less that said width to form mountain portions and valley portions on the right side and the reverse side randomly, and a net for grassing, characterized by adhering thin cotton to said net and adhering seeds and fertilizers to said thin cotton.

BRIEF DESCRIPTION OF THE DRAWINGS

FIG. 4(A), (B) is a front view showing another preferred embodiment of the present invention; and FIG. 5 is a perspective view showing a further preferred embodiment of the present invention.

DESCRIPTION OF THE PREFERRED EMBODIMENT

The construction of the present invention will be below described in more detail with reference to the preferred embodiments.

At first, the material composing the net is described. Tape-like papers and nonwoven fabrics or flat yarns formed of polyethylene and polypropyrene (2,000 to 3,000 deniers) are used as the wefts 1. These wefts are 3 mm to 3 cm wide (W) and 0.03 to 0.3 mm thick.

Monofilaments (400 to 500 deniers) having the same quality as said flat yarns are used as warps 2.

In addition, viscose rayon can be produced also in the form of sheet or film differently from the conventional rayon which is capable of being produced merely in the form of fiber and also its corrosion term can be easily regulated, so that it can be used also as said wefts 1 or said warps 2.

Figure 1A:
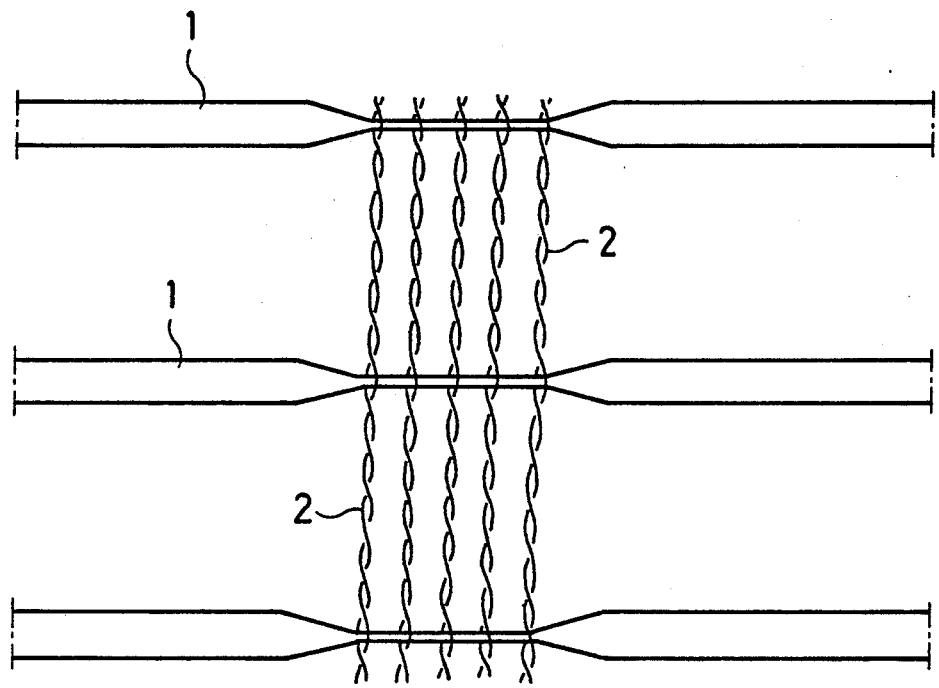
FIG. 1 is a perspective view showing a state that wefts are woven by means of warps.
Figure 1B:
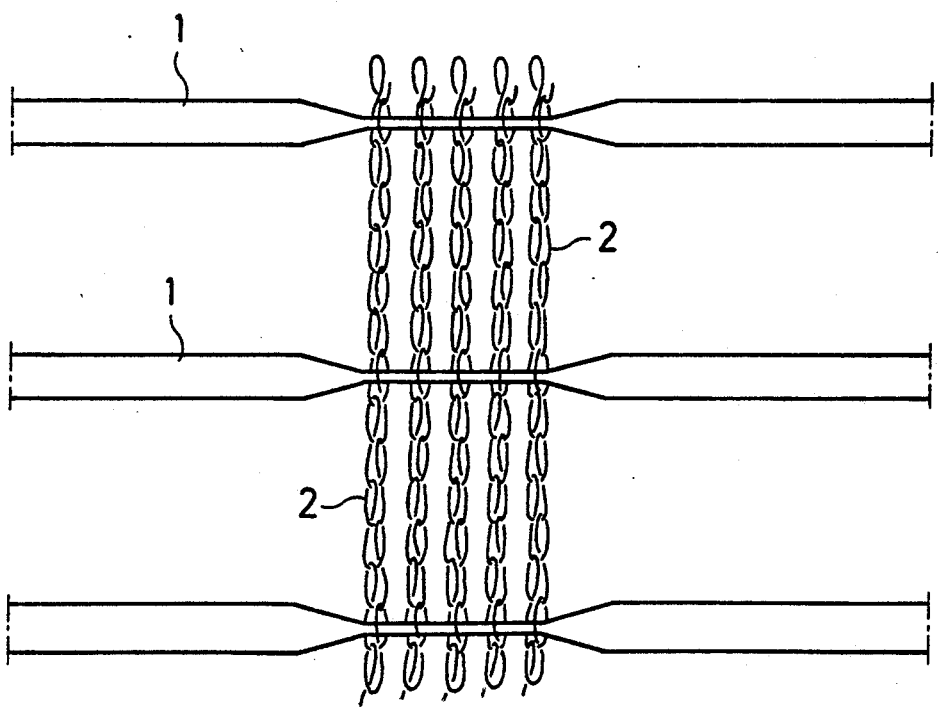

When the above described wefts 1 and warps 2 are knitted and woven by plain weaving, leno weaving, chain stitching and the like, the tensions acting upon the respective wefts 1 and warps 2 are regulated so that the tape-like papers and nonwoven fabrics or the flat yarns may be knitted and woven by means of the warps 2 in a texture less than said width (3 mm to 3 cm), as shown in for example FIG. 1(A) or FIG. 1(B).

Figures 2, 3:
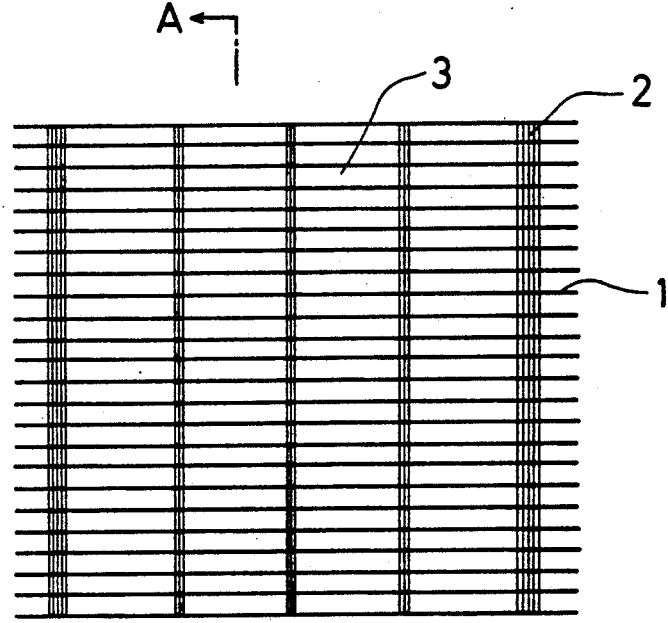
FIG. 2 is a sectional end view of FIG. 3 taken along the line A—A thereof.
FIG. 3 is a front view showing a net for grassing according to the present invention.

In the net knitted and woven by the above described method, the wefts 1 have a width, so that the mountain portions and the valley portions are randomly formed on the right side and the reverse side of the net, as shown in FIG. 2.

In addition, the randomness and volume of the wefts 1 are also be improved by twisting or drawing them when fed or previously.

In addition, a net-like substance formed of corrosion resistant threads can remain on the surface of the soil, and thus the effect or preventing earth and sand from being washed away can be maintained for a long time even after easily corrosible portions are corroded with the lapse of time and organic substances are introduced into the earth and sand by integrally forming the wefts 1 of easily corrosible materials and corrosion resistant materials and knitting and weaving them by corrosion resistant warps 2.

In addition, in the case where the easily corrosible wefts 1a and the corrosion resistant warps 1b are alternately used at suitable intervals to form the net, as shown in FIG. 4(A), the production can be made easy and the organic substances can be introduced into the soils by the corrosion of the easily corrosible portions.

In addition, as shown in FIG. 4(B), the corrosion resistant portions are remained in a substantially rectangular or belt-like shape after the easily corrosible portions have been corroded, the surface soils, which have been washed away, being collected in this belt-shaped portion, and the washed-away surface soils serving as a station for grassing, thereby promoting the grassing for the face of slope, too.

In addition, thin cotton layer 6, to which the seeds 4 and the fertilizers 5 are adhered, is adhered to said various kinds of net 3 for grassing, as shown in FIG. 5, to ensure still more the grassing for the face of the slope.

According to the present invention, the earth and sand can be prevented from being washed away in the first stage of construction and the sprayed materials can be surely prevented from being washed away by forming the mountain portions and valley portions randomly on the right side and reverse side of the net. Besides, the net capable of dispersing the water flowing along the surface of the face of slope and being corroded with the lapse of time to be returned to the soils as organic substances can be provided, thereby promoting the grassing for the face of slope, too.

What is claimed is:

1. A net assembly for encouraging the growth of vegetation on the slope of a ground surface, comprising: an open mesh net having a plurality of substantially parallel wefts comprised of a flat tape-like material having a predetermined width, the wefts being interconnected by a plurality of warps to provide a predetermined weave pattern for achieving a texture less than the width of the wefts, the texture having random spatially positioned protrusions and indentations on either side thereof to assist in the prevention of erosion of the ground soil, wherein the warps are comprises of a corrosion resistant material selected from a group consisting of corrosion resistant chemical flat yarns and corrosion resistant viscose rayon.

2. The net assembly of claim 1 in which the wefts are comprised of an easily corrodible material selected from a group consisting of corrodible paper, nonwoven fabrics, corrodible viscose rayon, and chemical flat yarns.

3. The net assembly of claim 1 wherein the wafts are within the range of 3 mm to 3 cm wide.

4. The net assembly of claim 3 wherein the weft material is selected to have a corrodible characteristic when the net assembly is installed.

5. The net assembly of claim 4 wherein the wefts are within the range of 0.03 to 0.3 mm thick.

6. The net assembly of claim 5 wherein a substantially thin cotton sheet having desired seeds and fertilizers adhered thereto is adhered to the net assembly.

7. The net assembly of claim 4 wherein corrosion resistant wefts are interconnected between the corrodible wefts at desired intervals for forming a substantially rectangular pattern during decomposition of the net assembly in the ground soil.

8. The net assembly of claim 4 in which the corrodible material and corrosion resistant material are comprised of organic materials.

9. An open mesh net assembly for encouraging the growth of vegetation, comprising:
a plurality of substantially parallel rectangular wefts having a predetermined width, the plurality of wefts comprised of a corrodible material selected from a group consisting of corrodible papers, nonwoven fabrics, corrodible viscose rayon, and chemical flat yarns;
a plurality of warps interconnecting the wefts using a predetermined weave pattern for achieving a texture less than the width of the wefts, the plurality of wraps comprised of a corrosion resistant material selected from a group consisting of corrosion resistant chemical flat yarns and corrosion resistant viscose rayon, and
a substantially thin cotton sheet adhered to the net, the cotton sheet having desired seeds and fertilizers adhered thereto, whereby the texture formed by the predetermined weave pattern has random spatially positioned protrusions and indentations on either side thereof.

10. The net assembly of claim 9 wherein corrosion resistant wefts are interconnected between the corrodible wefts at desired intervals form forming a substantially rectangular pattern during decomposition of the net.

11. The net assembly of claim 9 in which the corrodible material and corrosion resistant material are comprised or organic materials.

12. An open mesh net assembly for encouraging the growth of vegetation, comprising:
a plurality of substantially parallel flat rectangular wefts having a predetermined width within the range of 3 mm to 3 cm wide and a thickness within the range of 0.03 mm to 0.3 mm, the wefts alternately comprised of a corrodible material and a corrosion resistant material for forming a substantially rectangular pattern during decomposition of the net, the corrodible material and corrosion resistant material comprised of organic materials, and a plurality of warps interconnecting the wefts using a predetermined weave pattern for achieving a texture less than the width of the wefts, the plurality of warps comprised of an organic corrosion resistant material, whereby the texture formed by the predetermined weave pattern has random spatially positioned protrusions and indentations on either side thereof.

13. The net assembly of claim 12 wherein a substantially thin cotton sheet having desired seeds and fertilizers adhered thereto is adhered to the net assembly.

14. A net assembly for encouraging the growth of vegetation on the slope of a ground surface, comprising:

an open mesh net having a plurality of substantially parallel wefts comprised of a flat tape-like material having a predetermined width, the wefts being interconnected by a plurality of warps to provide a predetermined weave pattern for achieving a texture less than the width of the wefts, the texture having random spatially positioned protrusions and indentations on either side thereof to assist in the prevention of erosion of the ground soil, wherein the wefts are within the range of 3 mm to 3 cm wide, and the weft material is selected to have a corrodible characteristic, and the warp material is selected to have a corrosion resistant characteristic when the net assembly is installed.

15. The net assembly of claim 14 wherein the wefts are within the range of 0.03 to 0.3 mm thick.

16. The net assembly of claim 15 wherein a substantially thin cotton sheet having desired seeds and fertilizers adhered thereto is adhered to the net assembly.

17. The net assembly of claim 14 wherein corrosion resistant wefts are interconnected between the corrodible wefts at desired intervals for forming a substantially rectangular pattern during decomposition of the net assembly in the ground soil.

18. The next assembly of claim 14 in which the corrodible material and corrosion resistant material are comprised of organic materials.

19. The net assembly of claim 14 in which the weft material is selected from a group consisting of corrodible papers, nonwoven fabrics, corrodible viscose rayon, and chemical flat yarns.

20. The net assembly of claim 14 wherein the warp material is selected from a group consisting of corrosion resistant chemical flat yarns and corrosion resistant viscose rayon.

* * * * *